United States Patent
LaMantia

[19]

[11] Patent Number: 5,927,337
[45] Date of Patent: Jul. 27, 1999

[54] FLUID VALVE AND MANIFOLD ASSEMBLY

[75] Inventor: Raymond A. LaMantia, Rockford, Ill.

[73] Assignee: LSP Industries, Inc., Rockford, Ill.

[21] Appl. No.: 09/033,500

[22] Filed: Mar. 3, 1998

Related U.S. Application Data

[60] Provisional application No. 60/040,364, Mar. 10, 1997.

[51] Int. Cl.⁶ .................................................. F16K 5/06
[52] U.S. Cl. ........................... 137/883; 137/884; 251/288
[58] Field of Search ................................ 137/883, 884; 251/288

[56] References Cited

U.S. PATENT DOCUMENTS

| | | | |
|---|---|---|---|
| 2,297,576 | 9/1942 | Miller .......................................... | 277/20 |
| 3,111,139 | 11/1963 | Beckett et al. ............................ | 137/608 |
| 3,192,948 | 7/1965 | Anderson et al. ................... | 251/288 X |
| 4,168,724 | 9/1979 | Graffunder et al. ...................... | 137/606 |
| 4,230,143 | 10/1980 | Dettmann et al. ......................... | 137/270 |
| 4,714,091 | 12/1987 | Wagner ...................................... | 137/884 |
| 4,817,670 | 4/1989 | Gogel ........................................ | 137/884 |
| 4,819,877 | 4/1989 | Ciccolallo et al. ...................... | 239/266 |
| 4,848,391 | 7/1989 | Miller et al. ......................... | 137/884 X |
| 4,848,405 | 7/1989 | Albrecht .................................... | 137/884 |
| 4,934,411 | 6/1990 | Albrecht .................................... | 137/884 |
| 5,020,570 | 6/1991 | Cotter ................................... | 137/596.12 |
| 5,178,191 | 1/1993 | Schaefer .................................... | 137/884 |
| 5,313,985 | 5/1994 | Donner ...................................... | 137/884 |
| 5,341,846 | 8/1994 | Framberg .................................. | 137/884 |
| 5,459,953 | 10/1995 | Fukano et al. ....................... | 137/625.64 |

*Primary Examiner*—John Fox
*Attorney, Agent, or Firm*—Leydig, Voit & Mayer, Ltd.

[57] ABSTRACT

A modular valve block assembly adapted to form a manifold for fluid applications comprised of a plurality of individual valves having an outlet orthogonally disposed relative to the inlet. More specifically, the manifold of the present invention includes a plurality of individual valve blocks having one inlet, and two outlets. One outlet is disposed coaxially with the inlet and is adapted for direct or spaced connection to the inlet of another valve block. The other outlet of each block is provided at a ninety degree angle to the inlet to allow for connection to the machine or object receiving the compressed fluid. A ball or needle valve is provided to control the flow of fluid to the first outlet, the second outlet, or both. The present invention therefore provides a modular manifold assembly which allows for quick and inexpensive assembly without the need for costly and cumbersome "T" adapters and individual input lines in that the individual valves include orthogonally disposed inlets and outlets.

7 Claims, 5 Drawing Sheets

FLUID VALVE AND MANIFOLD ASSEMBLY

CROSS-REFERENCE TO RELATED APPLICATION

This application is related to Provisional U.S. Patent Application Ser. No. 60/040,364, filed on Mar. 10, 1997, and claims the full priority benefits accorded thereto pursuant to 37 C.F.R. §1.78 (a) (3).

FIELD OF THE INVENTION

The present invention generally relates to valves, and more particularly relates to modular valves adapted to connect together to form a manifold assembly.

BACKGROUND OF THE INVENTION

Many machines and operations use compressed gas or liquid as a source of power. With such fluid systems, a compressor is provided as a source of the compressed fluid, and a series of output conduits direct the compressed fluid to the receiving machine inlets. If the inlets are provided at distant locations, separate conduits for each inlet must be provided, resulting in a cumbersome, complicated, and costly system.

At the receiving machine inlet, a valve is provided to control fluid flow to the receiving machine. With prior art systems, the valves are only provided with coaxial inlets and outlets, i.e., an inlet in the back, and an outlet out the front and leading to the receiving machine. If the machine or operation is configured such that the conduit leading from the compressor does not make a direct, straight connection to the receiving machine, a "T" adapter, and additional tubing are required to make the angular transition. This also makes for a costly, and difficult to modify, system.

Moreover, with prior art systems, if the machine is designed such that the inlets are arranged in relatively close proximity, the above-identified problems are exacerbated in that the additional tubing and adapters are all confined to a relatively small area. This not only makes for difficult assembly, but difficult access for repair and maintenance as well. The prior art provides no form of manifold or manifold assembly which enables multiple receiving machines to be fed from a single inlet to the manifold to thereby eliminate costly and cumbersome adapters and excess tubing.

Prior art valves have disclosed means of connecting two or more substantially similar valves together to form a manifold. For example, U.S. Pat. No. 2,297,576, issued to Miller discloses a valve arrangement which allows multiple valves to be tied together, and wherein each valve includes a distinct inlet but the valve manifold combines all of the inflowing fluid into a single output. A single control shaft is provided with cams attached at each valve to control the amount of inflowing fluid being combined in a given proportion. Other types of stack valves are disclosed in U.S. Pat. No. 3,111,392 to Beckett and U.S. Pat. No. 5,178,191 to Schaefer.

A still further valve manifold or stack assembly is disclosed in U.S. Pat. No. 5,341,846 issued to Framberg. However, as with the aforementioned prior art, it fails to disclose a fluid valve and manifold assembly wherein a plurality of modular valves can either be connected directly adjacent one another, or can be connected at a spaced distance. Moreover, the prior art fails to disclose the aforementioned valve and manifold assembly wherein each valve includes an independent means of flow control. The prior art also fails to provide a modular valve block which enables adjacent blocks to be connected together at any angular disposition relative to each other across a full 360° arc.

SUMMARY OF THE INVENTION

A general aim of the present invention is therefore to provide a fluid valve having an outlet which is orthogonally disposed relative to the inlet to thereby eliminate the need for "T" adapters and additional tubing.

Another general aim of the present invention is to provide a manifold assembly for fluid applications which provides for quick and inexpensive assembly and operation to thereby eliminate excess tubing and allow easy access for repair and modification.

An objective of the present invention is to provide such a manifold assembly in a modular form having a number of identical individual valves adapted to be quickly connected and modified.

Another objective of the present invention is to provide the manifold assembly formed with a limited number of components to thereby lower replacement inventory costs and repair downtime.

It is still another objective of the present invention to provide a manifold assembly with the ability to provide two or more valves connected directly together while still enabling additional valves to be connected to such valves at a spaced distance.

It is still another objective of the present invention to provide the aforementioned valve assembly wherein such direct and spaced connection of valves can be accomplished using valves of a substantially identical design.

It is still another objective of the present invention to provide a modular manifold assembly wherein identical valves can be connected together to allow fluid to be dispensed at angularly spaced 90° increments.

In order to accomplish these and other objectives, the present invention provides individual block valves having an inlet, a first outlet coaxially disposed relative to the inlet, and a second outlet orthogonally disposed relative to the inlet. The fluid from the compressor can therefore enter the valve inlet and either proceed directly on to the next valve in the series, or make a ninety degree turn to reach the receiving machine. A ball or needle valve having a means for movement thereof can be employed to direct the compressed fluid to the first outlet, the second outlet, or both.

Another feature of the present invention, is to provide the inlet and the coaxial first outlet with annular recesses adapted to receive an O-ring. Therefore, when the inlet of a second valve block is positioned adjacent the outlet of a first valve block, the O-ring can be compressed therebetween for adequate sealing thereof.

It is still another feature of the present invention to provide identical modular valve blocks in order to provide for easy assembly of one valve block directly to another. Four holes are provided radially about the inlet and continuation outlet of each valve block. Each hole is countersunk and passes completely through the block. Therefore, a threaded fastener can pass through a hole of one block and connect to a hole of the adjacent block. A nut is then attached to the exposed threads of the fastener.

Yet another feature of the present invention is to attach the valve blocks with threaded fasteners, which themselves include tapped heads. The fasteners can therefore be attached through aligned through-holes in that subsequent screws are fastened directly to the tapped heads of the preceding fastener.

A still further feature of the present invention is to provide the inlet and coaxial outlet with internal threads to enable the individual valve blocks to be connected together at a distance using threaded pipes or conduits. Systems can therefore be created wherein some valve blocks are located directly adjacent one another, and other valve blocks are connected in spaced relation.

These and other aims, objectives, and features of the present invention will become more apparent from the following detailed description when taken in conjunction with the accompanying drawings.

Figure 1:
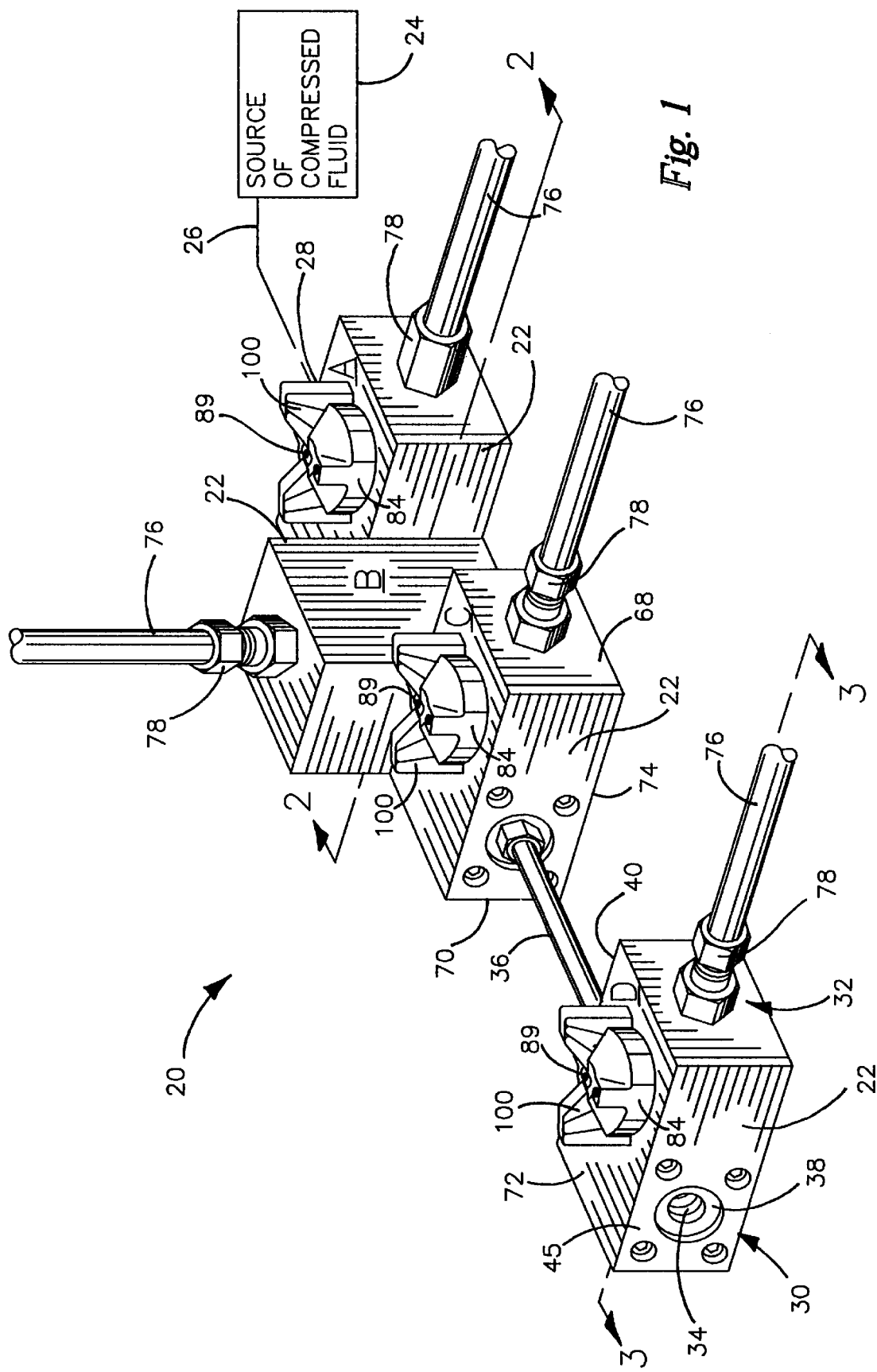
FIG. 1 is a perspective view of the preferred embodiment of the present invention showing three valve blocks connected directly together, and one valve block connected thereto at a distance.

While the present invention is susceptible of various modifications and alternative constructions, a certain illustrative embodiment thereof has been shown in the drawings and will be described below in detail. It should be understood, however, that there is no intention to limit the present invention to the specific form disclosed, but on the contrary, the present intention is to cover all modifications, alternative constructions and equivalents falling within the spirit and scope of the invention described herein.

DETAILED DESCRIPTION OF THE PREFERRED EMBODIMENT

The present invention is generally depicted as element 20 in FIG. 1. By way of example only, four individual valves 22 are shown, with three valves, A, B, and C, connected directly together, and a third valve, D, connected at a distance thereto. It is to be understood that a variety of configurations, including a lesser or greater number of valves blocks 22, are possible depending on the particular application. What the present invention provides, inter alia, is a modular manifold assembly which can be quickly assembled and modified without costly customized hardware, and individual valve blocks 22 having orthogonally disposed inlets and outlets.

As shown in FIG. 1, a source 24 of compressed fluid, shown in block form in the drawing, is provided for distribution to various elements on a given machine (not shown). The compressed fluid from source 24 is directed, using a single outlet line 26, to the inlet 28 (see FIG. 2) of a valve block A. In the preferred embodiment, line 26 is a metal tube having external threads disposed at both ends for attachment to inlet 28 and to compressor 24. Alternative embodiments could employ different means for connection of the elements. It is to be understood that source 24 could be any number of fluids including, but not limited to, compressed air for pneumatic operations, and hydraulic fluid.

Using block C as an example, it can be seen that in addition to inlet 28, each block 22 includes a continuation outlet 30 and a destination outlet 32. Continuation outlet 30 is provided coaxial with inlet 28, and is also provided with internal threads 34 (see block D) adapted for threaded attachment to continuation conduit 36. Outlet 30 and inlet 28 can therefore be formed at the same time through a simple and inexpensive drilling and tapping process.

Figure 2:
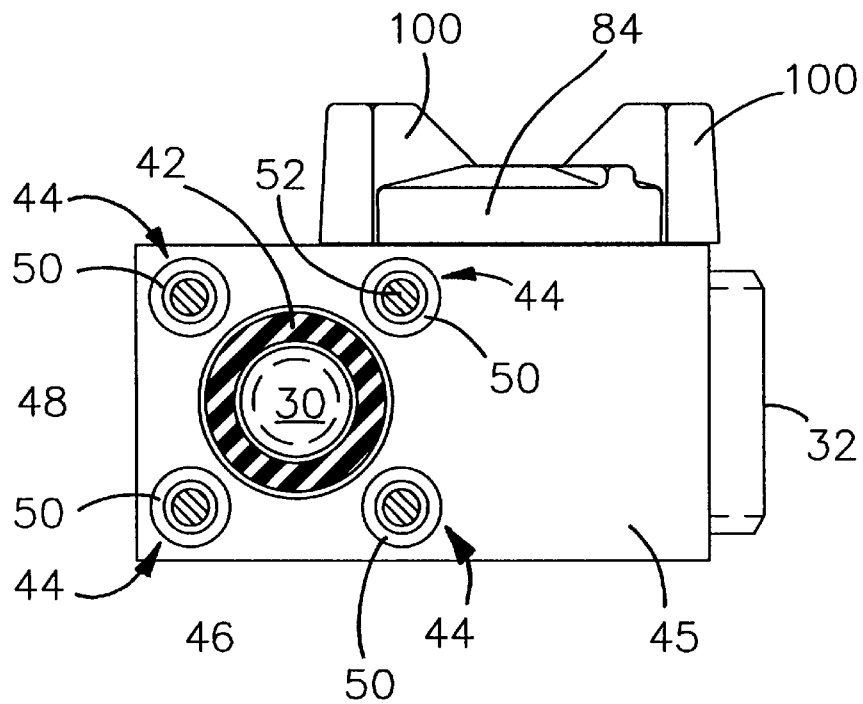
FIG. 2 is a sectional view taken along line 2—2, of one valve block of the embodiment shown in FIG. 1.

As best shown with respect to block D, it can be seen that each continuation outlet 30 includes an annular recess 38 machined into side 40 of valve block 22. Recess 38 is provided to receive an O-ring 42 (see FIG. 2) therein and to be compressed against side 45 of an adjoining block 22. As shown in FIG. 2, side 45 includes annular recess 46 which is also adapted to receive O-ring 42. O-ring 42 is provided between block A and block B to provide a sealed connection between the continuation outlet 30 of block A, and the inlet 28 of block B.

Figure 4:
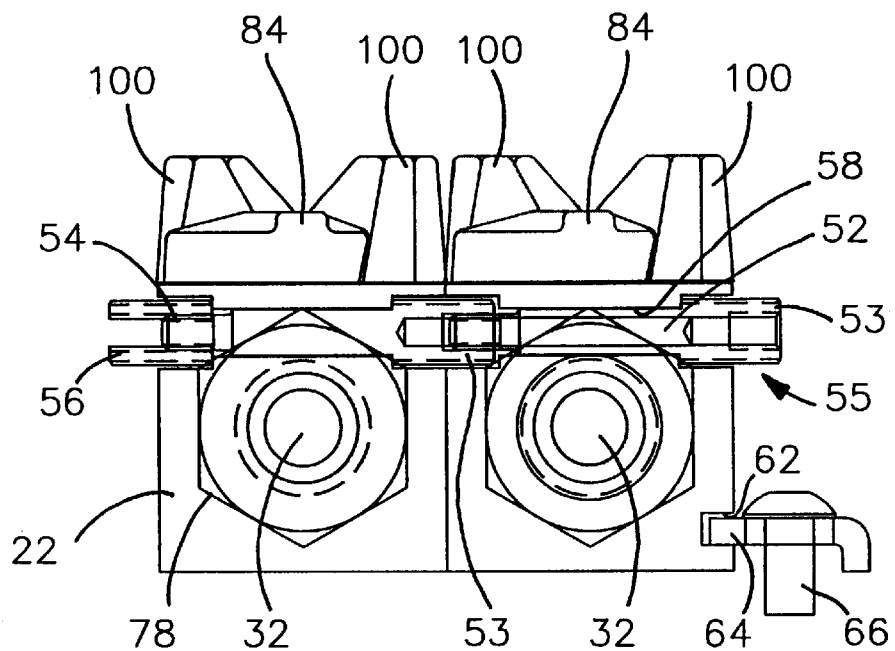
FIG. 4 is a front view of the preferred embodiment of the present invention showing the tapped head mounting screws in dashed lines.

In order to securely fasten block B to block A, and adequately compress O-ring 42 to provide an effective seal therebetween, the preferred embodiment of the present invention provides four apertures 44 about the circumference 48 of continuation outlet 30. Each aperture 44 is identical and includes countersunk 50. As shown in FIG. 4, fasteners 52 having tapped heads 53 then pass through apertures 44 with tapped heads 53 being received in countersinks 50. Threads 54 of fasteners 52 are then screwed into heads 53 of adjoining fasteners. The head 53 of one fastener 52 must necessarily extend from the side of block 22 as indicated at 55. A nut 56 is then used to attach to the threads 54 of the fastener 52 protruding through the opposite side of modular valve assembly 20. In so doing it can be seen that each block 22 can be identically manufactured to reduce inventory costs and improve maintenance.

One other benefit of such geometry and modular design is best depicted in FIG. 1. As shown therein block B is turned ninety degrees with respect to blocks A, C, and D. This is possible because apertures 44 as well as inlets 28 and outlets 30 are aligned regardless of the angular disposition of the blocks. Block B could be rotated another ninety degrees to thereby position destination outlet 32 in the opposite direction of blocks A, C, and D. Similarly, block B could be rotated another 180° or any of blocks A, C, and D would be rotated as well. Manifold 20 can thereby be configured in multiple positions with destination outlets 32 directed in various directions to suit the particular application.

Figure 6:
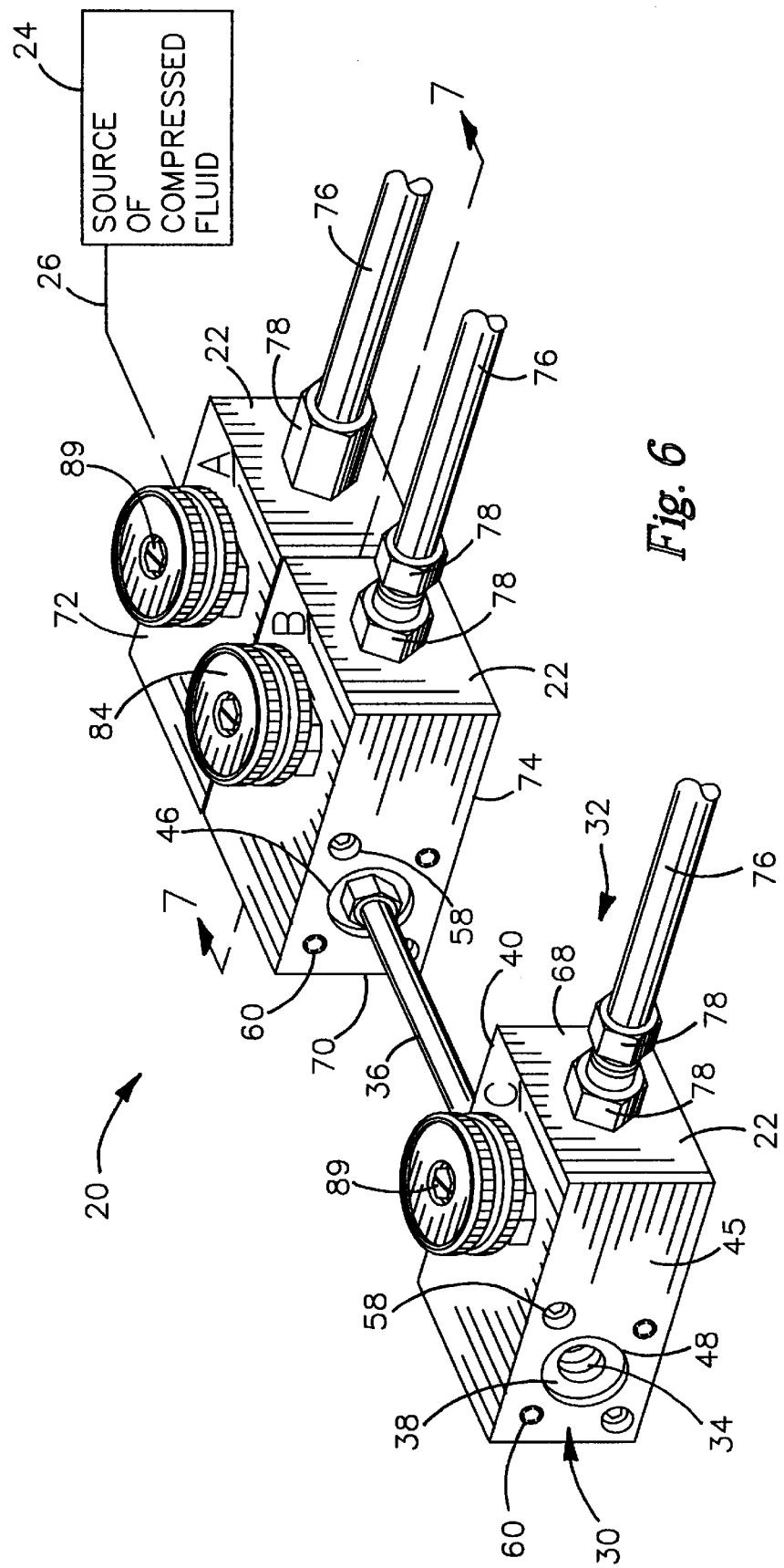
FIG. 6 is a perspective view of an alternative embodiment of the present invention.
Figure 7:
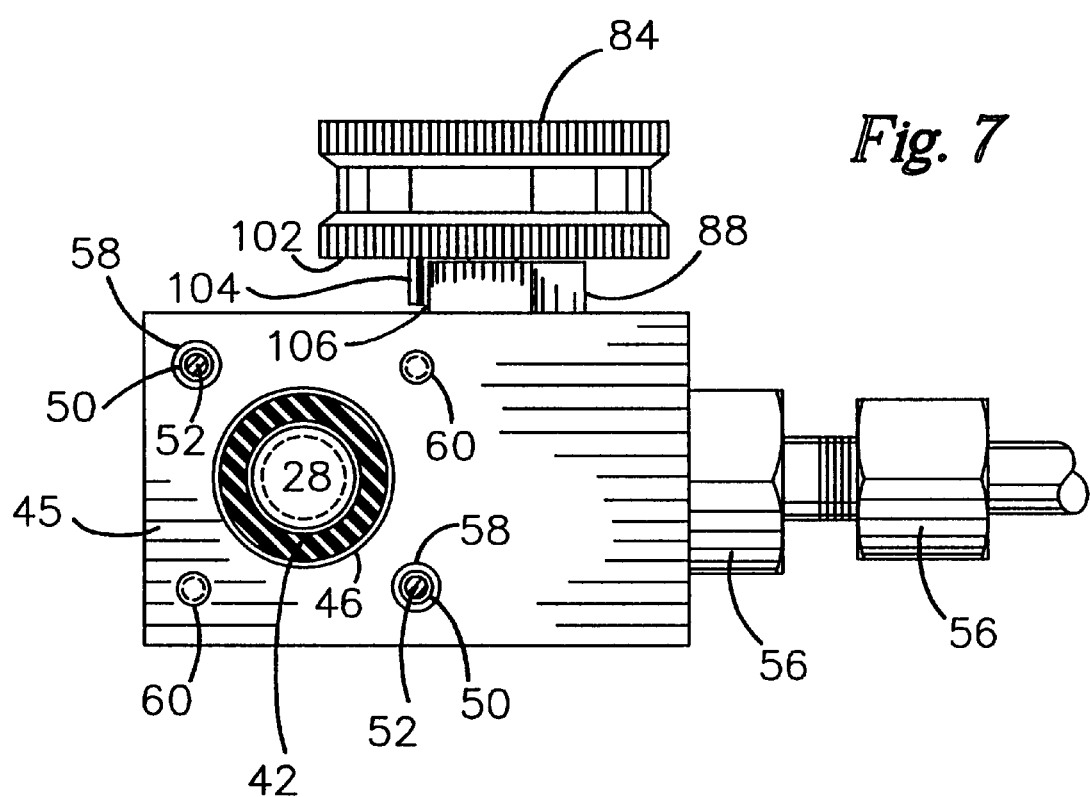
FIG. 7 is a sectional view of the embodiment shown in FIG. 6 taken along line 7—7.

In an alternative embodiment, shown in FIGS. 6–7, block B includes one set of through-holes 58, and another, diagonally disposed set of halfway holes 60. It is within through-holes 58 that threaded fasteners 52 pass for connection to the halfway holes 50 of block A. In order to prevent protrusion of the heads of fasteners 52 from side 40, and thereby allow a flush connection between adjoining valve blocks 22, through-holes 58 are provided with countersinks 50.

For the sake of clarity, it is important to note that if a third valve block were to be directly connected in series to side 40 of block B, a valve block 22 having oppositely disposed through-holes 58 would be used such that its through-holes 58 would align with the halfway holes 60 of block B. Therefore, the third valve block 22 would have the aperture configuration of blocks A and C. As best shown with respect to block C, it can be seen that its through-holes 58 are oppositely disposed to that of block B. Similarly, its halfway holes 60 are aligned with the through-holes 58 of block B.

By providing the blocks with such a system of flush interconnectability, the present invention is able to provide for direct, close connection between adjoining blocks from a very limited number of valve block types. This not only minimizes the space requirements of the present invention, but also minimizes the number of parts needed to be maintained in inventory in the event repair or modification is required.

FIG. 4 shows the structure with which manifold 20 can be secured to a surface. Blocks 22 include groove 62 which is dimensional to receive flange 64. Flange 64 can then be secured to a surface such as a floor, machine frame or the like using fastener 66.

Referring now to the destination outlets 32 of each valve block 22, each outlet 32 is orthogonally disposed relative to the coaxial inlet 28 and continuation outlet. Although depicted in the drawings as having the destination outlet 32 in side 68, the present invention also includes embodiments wherein destination outlet 32 is provided in side 70, top 72, or bottom 74. Moreover, although destination outlets 32 are shown being at a ninety degree angle to inlet 28, the present invention also includes embodiments where outlets 32 are provided at a different angular disposition relative to inlet 28.

Destination outlet 32 is similar to continuation outlet 30 and inlet 28, in that it is provided with internal threads adapted to receive threaded outlet conduits 76. In the preferred embodiment, nuts 78 are used to make a secure attachment, and an annular recess and O-ring (FIG. 4) are provided to make a sealed attachment between output conduit 76 and destination outlet 32.

The actual operation of the valve block 22 can be controlled by any number of conventional internal valve designs including, but not limited to, ball valves and needle valves. Although various valve types can be employed, the present invention is primarily directed to the modular nature, and compact/spaced connectability of valve blocks 22, as well as the orthogonal disposition of destination outlet 32 relative to inlet 28.

Figure 3:
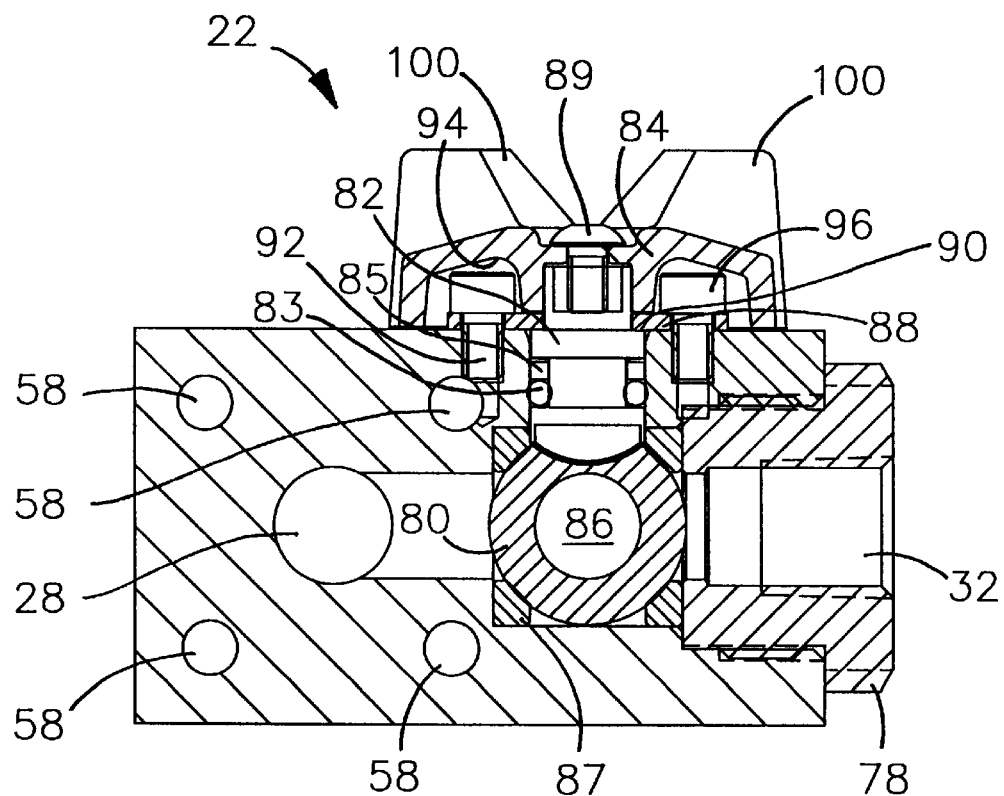
FIG. 3 is a sectional view of the embodiment shown in FIG. 1 taken along line 3—3.

While it is true that the actual operation of the valve block 22 can be controlled by any number of conventional internal valve designs, the preferred embodiment of the present invention, as best shown in FIG. 3, uses a ball valve 80 attached to shaft 82 and in turn attached to control knob 84. Shaft 82 is mounted with O-ring 83 and back-up ring 85 to facilitate sealing rotation and includes a passage 86 disposed therethrough perpendicular to the axis of shaft 82. Upon rotation of knob 84, shaft 82 is correspondingly rotated which in turn rotates passage 86. In an open position, passage 86 will fluidically connect inlet 28 to destination outlet 32, while in the closed position shown in FIG. 3, fluid flow will be completely shut-off. Through the provision of the preferred embodiment of the present invention, movement between the open and closed positions can be attained through ninety degrees rotation of control knob 84 and thus shaft 82. A pair of sealing gaskets 87 is provided about ball valve 80.

Figure 5:
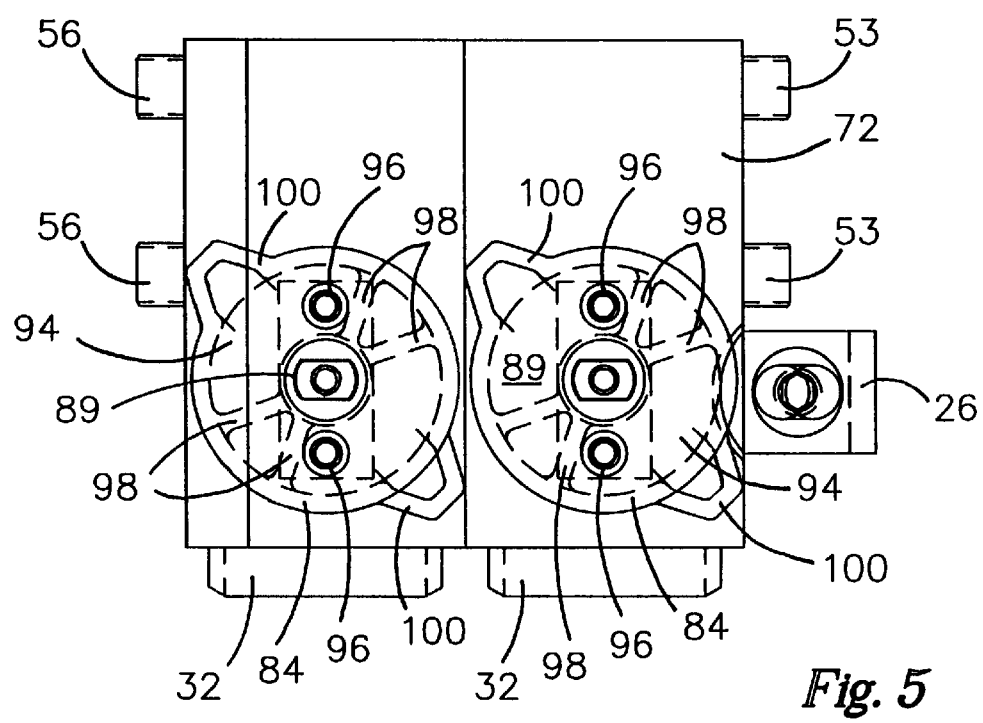
FIG. 5 is a top view of the preferred embodiment of the present invention showing the actuation knob with limit screws in dashed lines.

A control knob 84 is provided on each valve block 22 for control and direction of compressed fluid to continuation outlet 30, destination outlet 32, or both. Alternative control mechanism could be employed with similar efficacy. In the preferred embodiment shown in FIG. 2, control knob 84 is connected to shaft 82 by fastener 89 which itself is held in block 22 by platform 88. As shown in FIG. 3, shaft 82 includes shoulder 90 which engages platform 88. Since platform 88 is held to block 22 by fasteners 92, knob 84 is in turn held to block 22. Referring now to FIG. 5, it can be seen that in the preferred embodiment knob 84 includes arcuate channels 94 which are sized to receive heads 96 of fasteners 92. Channels 94 include distinct endstops 98 which engage heads 96 when knob 84 is in a fully open or fully closed position. Furthermore, knob 84 includes a pair or upwardly extending fingers 100 which provide the user with a visual indication of the valve position.

In the alternative embodiment shown in FIGS. 6–7 the underside 102 of each knob 84 includes a downwardly depending finger 104 which engages side 106 of platform 88 to limit rotation of knob 84 to a range of ninety degrees and thereby provide the user with a tactile indication that valve is fully opened to the continuation outlet 30, or the destination outlet 34, or is intermediately positioned.

From the foregoing, it can be appreciated that the present invention provides a new and improved fluid valve manifold assembly. By providing a plurality of valve blocks adapted for direct or spaced connection, and each having a coaxial and an orthogonal output, the blocks can easily be configured to meet almost any design criterion, without the costly and time consuming process of customizing each application with individual input and output lines, and "T" adapters. Moreover, should the system change and necessitate modification to the manifold, the present invention can much more easily be modified by adding or subtracting blocks, as opposed to prior art systems which might have to be disassembled and partially, or totally, rebuilt. Since each block is identical in the preferred embodiment, the blocks can be configured in angularly displaced positions relative to each other.

What is claimed is:

1. A fluid valve and manifold system, comprising:

a plurality of first blocks each having an inlet in a first side and a continuation outlet in a second side opposite the first side, the inlet and continuation outlet being concentric and fluidically connected, the first blocks further including a destination outlet disposed in a third side normal to the first and second sides, each first block including means for controlling fluid flow between the inlet and the destination outlet, each inlet and continuation outlet being internally threaded and including an annular recess, each first block including a pair of countersunk through-holes diametrically disposed about the destination outlet and a pair of threaded apertures diametrically disposed about the destination outlet and interposed between the through-holes;

a plurality of second blocks identical to the first blocks except having through-holes and threaded apertures rotationally translated ninety degrees with respect to the first block through-holes and threaded apertures;

a plurality of threaded fasteners adapted to pass through the through-holes of one block and into the threaded apertures of another block when direct connection is required;

a plurality of O-ring gaskets adapted to be received into the inlet and continuation outlet annular recesses when first and second blocks are connected directly together; and a plurality of conduits having first and second threaded ends adapted to connect inlets to destination outlets when it is desired to connect blocks at a spaced distance.

2. The fluid valve and manifold system of claim 1 wherein the first and second valve blocks each include four holes having first and second countersunk ends disposed symmetrically about the inlet and continuation outlet, and the assembly further includes four threaded fasteners adapted to pass through the holes of the first block and attach to the holes of the second block.

3. The fluid valve and manifold system of claim 2 wherein the four fasteners each include internally tapped heads.

4. The fluid valve and manifold system of claim 3 wherein the second block is rotated ninety degrees relative to the first block.

5. The fluid valve and manifold system of claim 4 wherein each first and second block includes a manually operable knob connected to the means for controlling fluid flow, whereby fluid flow through each destination outlet can be individually controlled.

6. The fluid valve and manifold system of claim 4 wherein the means for controlling fluid flow includes a shaft attached to the knob having a passage therethrough normal to the axis of the shaft, the passage adapted to fluidically connect the inlet to the destination outlet and disconnect the inlet from the destination outlet upon a ninety degree rotation of the knob and shaft, the knob including a pair or arcuate channels to limit such rotation of the knob.

7. The fluid valve and manifold system of claim 1 wherein the means for controlling fluid flow includes a manually operable knob connected to a rotatable shaft extending into the block, the shaft having a passage therethrough normal to the axis of the shaft, the passage adapted to fluidically connect the inlet to the destination outlet when in an open position, and adapted to disconnect the inlet from the destination outlet when in a closed position, the open and closed position being ninety degrees of shaft rotation apart.

* * * * *